United States Patent Office 3,650,930
Patented Mar. 21, 1972

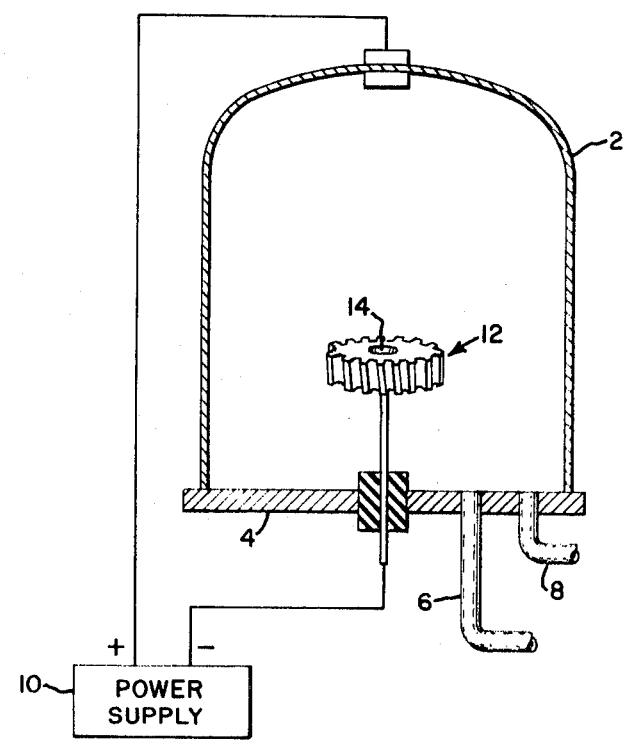
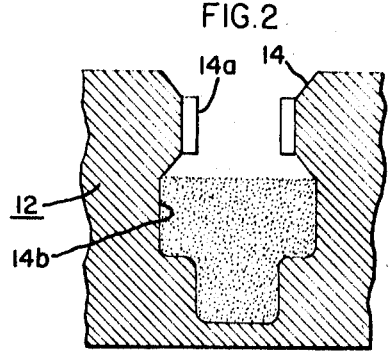
INVENTORS:
CLAUDE K. JONES,
STUART W. MARTIN,
BY *W. C. Crutcher*
THEIR ATTORNEY.

3,650,930
GLOW DISCHARGE MASKING PROCESS
Claude K. Jones, Marblehead, and Stuart W. Martin, Salem, Mass., assignors to General Electric Company
Filed Oct. 27, 1969, Ser. No. 869,815
Int. Cl. C23c 11/14; B01k 1/00
U.S. Cl. 204—177
6 Claims

ABSTRACT OF THE DISCLOSURE

Glow discharge masking process using comminuted material to selectively limit the treatment of a cathode workpiece cavity limiting, to that extent, ionitriding on the cavity walls.

BACKGROUND OF THE INVENTION

This invention relates to glow discharge apparatus for ion nitriding (or "ionitriding" as it is known in the art) or otherwise treating metal workpieces in a glow discharge environment. More particularly, the present invention is related to a mechanical masking or inhibitor to provent glow discharge from penetrating certain undesirable areas of a workpiece.

Generally, a glow discharge apparatus, such as is used for ionitriding, comprises a vacuum chamber in which is mounted a workpiece which is insulated from the chamber. The chamber is evacuated by means of a vacuum pump, and then charged to a predetermined pressure level, on the order of 1 mm. of mercury, with a suitable gas, depending on the operation to be performed. A source of current is connected such that the vacuum chamber or container serves as the anode and the workpiece as the cathode. When voltage is applied and gradually increased, the rarified gaseous atmosphere becomes ionized. Concurrently, at some voltage level, depending on the degree of vacuum and the distance between anode and cathode, a current or discharge is produced through the atmosphere which produces a glow in the gas atmosphere. This glow discharge, if uninhibited, spreads uniformly over all exposed surfaces of a workpiece cathode.

One use for such an apparatus is in the process of ionitriding. For this process, the atmosphere within the vacuum chamber is typically charged with nitrogen, and the ionized nitrogen is accelerated into and bombards the surface of a workpiece cathode, heating it up and imparting a nitrided "case" to it. In some workpieces, it is desirable to restrict the nitrided surface to particular areas where case hardening is desired and to prevent the nitriding process from taking place in other areas of the workpiece. Since the ion bombardment occurs uniformly on the surface of a workpiece wherever the glow discharge is present, and since the glow discharge is present uniformly over the workpiece surface wherever it is exposed, it is therefore necessary, in order to selectively prevent or inhibit the presence of the glow discharge on the surface of a workpiece.

A useful apparatus and process for masking the cavity of a workpiece without distortion and preventing ionitriding of the cavity walls is disclosed in pending application Ser. No. 612,228 filed in the names of C. K. Jones and S. W. Martin on Jan. 27, 1967, now U.S. Pat. No. 3,536,602 and assigned to the present assignee. There a gas pervious shield was used to prevent the ionitriding of cavity walls beyond the shield. In some cases, however, the cavity in a workpiece will be enlarged in size or diameter beyond the size of the opening thereto. In such cases in the past, it has been necessary to assemble shields or blocking members in sections, insert the sections through the opening and then reassemble them in the enlarged portion of the cavity. This is a time-consuming operation and leads to imperfect results.

Accordingly, it is an object of the present invention to provide a process to selectively inhibit the glow penetration into a workpiece cavity in a glow discharge apparatus.

Another object is to provide a means to prevent distortion in ionitrided workpieces.

Another object of the present invention is to provide a means to mask a workpiece cavity in a glow discharge apparatus to selectively expose areas thereof to a glow discharge.

Other objects, advantages and features of the present invention will become apparent from the following description of one embodiment thereof, when taken in connection with the accompanying drawing.

SUMMARY OF THE INVENTION

Briefly stated, the invention is practiced by connecting a workpiece having a cavity therein as the cathode in a glow discharge apparatus, pouring a comminuted material of selected characteristics into the cavity and establishing a glow discharge. The comminuted material prevents treatment of the cavity walls.

Drawing

FIG. 1 is a simplified elevation view, partly in section, of a typical glow discharge apparatus.

FIG. 2 is an enlarged cross-sectional view of a typical workpiece in conjunction with the glow inhibitor of the present invention.

DESCRIPTION OF THE PREFERRED EMBODIMENT

Referring now to FIG. 1, a glow discharge apparatus is shown generally including a vacuum container 2 supported on a supporting base 4. An evacuation line 6 extends from the interior of the vacuum container 2 to a vacuum pump not shown. A charging conduit 8 extends from the interior of the vacuum container 2 to a source of charging gas as, for example, nitrogen, not shown. A source of electric current 10 is connected at its positive terminal to the vacuum container 2 such that the vacuum container, including the supporting base, is at the same potential as the positive terminal and serve as the anode of the present glow discharge system. Within the vacuum container 2, a workpiece 12 is suitably supported so as to be insulated from the anode 2 and is electrically connected to the negative terminal of the power supply 10 so as to serve as the cathode of the present system.

The foregoing is descriptive of the background of the present invention. In operation, the vacuum container 2 is evacuated through evacuation line 6 and then charged through charging conduit 8 with a suitable atmosphere as, for example, nitrogen if a nitriding process is to be performed, and to a suitable pressure as, for example, 1 mm. of mercury. DC voltage is applied from its source 10 and gradually increased until the atmosphere within vacuum container 2 is ionized and a discharge therethrough produces a glow. Suitable adjustments of voltage and pressure will result in a change in the position and thickness of the glow relative to the workpiece cathode. That is, increased chamber pressure will result in a narrowing of the glow depth relative to the workpiece. Voltage increase to a certain range results in a stable glow discharge. Beyond this voltage range, the glow deteriorates into an arc. Generally, the glow appears adjacent the skin of the cathode or workpiece. Moreover, it covers every exposed area of the cathode.

It is sometimes desirable to nitride a part of a workpiece without nitriding other parts thereof. For purposes of illustrating the present invention, consider a workpiece having internal gear teeth. The internal gear teeth are located only at the opening of a cavity 14 which is enlarged inside the workpiece. In nitriding such a member, it is desirable to nitride only the gear teeth and not to nitride the interior of the member.

Referring now to FIG. 2 of the drawing, which is an enlarged cross section through the center of the workpiece 12, the cavity 14 is seen to comprise a relatively narrow opening defined by the ring of internal gear teeth 14a and an enlarged interior portion 14b.

In accordance with the invention, portion 14b is filled with a selected comminuted material up to the level that it is desired to protect from the glow discharge. The comminuted material is powdered or pulverized, preferably in a range of .030" to .060" particle size, but we have found that about particle size of .050" gives the best results.

If the particle size is too small, the rapid evolution of gas on the pump-down cycle will cause the material to erupt and fly around in the system. If the particle size is too large, on a conducting material, hollow cathodes will form and this will cause the material to overheat.

One of the criteria for the material is that it should have a minimum absorption of gases such as oxygen, nitrogen or water vapor. The reason for this is that during evacuation of the glow discharge chamber preparatory to initiating the process, it is necessary to remove all residual gases. Another important restriction on the powder selected is that it should not be decomposed under the action of the glow discharge.

The material may be either conducting or non-conducting, depending upon the results to be achieved. In practice, a suitable conducting powder is pure iron powder. A suitable nonconducting powder is silicon dioxide (silica gel).

The selection of a conducting or nonconducting powder depends upon the extent to which it is desired that the comminuted material be heated by the glow, thereby transferring its heat to the work piece. For example, if a conducting material is used, a glow will form on the surface of the powdered material and raise its temperature; whereas, if a nonconducting powder is used, no such glow will form on the material.

After a glow discharge has been established and the piece ionitrided or otherwise treated, the chamber is opened and the comminuted material may simply be poured from the cavity. It will be found that the cavity walls have been effectively masked from the action of the glow.

It will be apparent that a very simply and effective means of masking the enlarged interior of a workpiece cavity has been described. The use of comminuted material provides a very simple and effective means of solving this problem.

What is claimed is:

1. A method of selectively ionitriding a workpiece having a cavity therein comprising the steps of:
   connecting said workpiece as one electrode in a glow discharge apparatus,
   filling at least a portion of said cavity with comminuted material, establishing a glow discharge in said apparatus to treat said workpiece while masking said cavity portion, and
   removing said comminuted material.

2. The combination according to claim 1, wherein said comminuted material is a nonconducting powder selected from materials which have a minimum tendency to absorb gases and which do not decompose under the action of the glow discharge.

3. The combination according to claim 2, wherein said powder is silica gel.

4. The combination according to claim 1, wherein said comminuted material is selected from a group of electrically conducting powders of particle size between .030 to .060 inch and which have a minimum tendency to absorb gases.

5. The combination according to claim 4, wherein said conducting powder is iron.

6. The method of selectively ionitriding a workpiece defining a cavity therein with a comparatively narrow neck portion and an enlarged interior portion comprising:
   filling the enlarged portion of said cavity through said opening with a comminuted material,
   connecting said workpiece as a cathode in a vacuum container having a low pressure nitrogenous atmosphere,
   establishing a glow discharge within said container and ionitriding the workpiece along with said neck portion of said cavity, and
   opening the container and removing said comminuted material from the workpiece cavity.

References Cited
UNITED STATES PATENTS

| | | | |
|---|---|---|---|
| 2,472,304 | 6/1949 | Mason | 204—17 |
| 3,389,070 | 6/1968 | Berghaus et al. | 204—177 |
| 2,955,998 | 10/1960 | Berghaus et al. | 204—312 X |
| 3,485,666 | 12/1969 | Sterling et al. | 204—312 X |

F. C. EDMUNDSON, Primary Examiner